US009699330B2

(12) United States Patent
Odaira

(10) Patent No.: US 9,699,330 B2
(45) Date of Patent: Jul. 4, 2017

(54) IMAGE PROCESSING APPARATUS, CONTROL METHOD THEREFOR, AND STORAGE MEDIUM FOR TRANSMITTING IMAGE DATA TO A PLURALITY OF DESTINATIONS

(71) Applicant: CANON KABUSHIKI KAISHA, Tokyo (JP)

(72) Inventor: Masahiro Odaira, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/601,939

(22) Filed: Jan. 21, 2015

(65) Prior Publication Data
US 2015/0207945 A1  Jul. 23, 2015

(30) Foreign Application Priority Data
Jan. 23, 2014 (JP) ................................ 2014-010701

(51) Int. Cl.
*G06F 3/12* (2006.01)
*H04N 1/00* (2006.01)
*H04N 1/32* (2006.01)
*G06K 15/00* (2006.01)

(52) U.S. Cl.
CPC ..... *H04N 1/00217* (2013.01); *H04N 1/32064* (2013.01); *H04N 1/32096* (2013.01); *H04N 2201/0094* (2013.01)

(58) Field of Classification Search
CPC ....... H04N 2201/0094; H04N 1/00217; H04N 1/00244; H04N 1/00954; H04N 1/32534; H04N 1/00795
USPC ...... 358/1.1, 1.13, 1.15, 1.18, 403; 709/203, 709/238
See application file for complete search history.

(56) References Cited

U.S. PATENT DOCUMENTS

| 6,072,862 A * | 6/2000 | Srinivasan .......... H04L 12/5835 379/100.08 |
| 6,230,189 B1 * | 5/2001 | Sato ................... H04N 1/00209 358/401 |
| 6,801,340 B1 * | 10/2004 | Endo .................. G07B 17/0008 358/1.15 |
| 2001/0013069 A1 * | 8/2001 | Shah ................... G06Q 10/109 709/238 |
| 2008/0100875 A1 * | 5/2008 | Takenoshita ....... H04N 1/00214 358/403 |
| 2008/0137152 A1 * | 6/2008 | Oguri ................. H04N 1/00384 358/440 |
| 2010/0134839 A1 * | 6/2010 | Hibino ............... H04N 1/00222 358/1.15 |
| 2012/0200875 A1 * | 8/2012 | Kodimer ................ G06Q 10/06 358/1.13 |

FOREIGN PATENT DOCUMENTS

JP      2012-142670 A    7/2012

* cited by examiner

Primary Examiner — Gabriel Garcia
(74) Attorney, Agent, or Firm — Canon U.S.A., Inc. IP Division

(57) ABSTRACT

A multi function peripheral (MFP) receives a setting of destination information from a user (FIG. 6). Each time the MFP reads a predetermined number of documents, the MFP repeats a series of steps of establishing a communication session with a destination (S1006), transmitting image data (S1007), and ending the communication session with the destination (S1008). Thereby, the MFP transmits image data to a plurality of destinations (S1001 to S1011).

20 Claims, 15 Drawing Sheets

FIG. 6A

SELECT FUNCTION
SCAN AND TRANSMIT ~601
COPY ~602

FIG. 6B

ENTER DESTINATION
E-MAIL  abc@xx ~603
SELECT FROM ADDRESS BOOK ~604
DOCUMENT SIZE: A4
COLOR MODE: COLOR

FIG. 6C

SELECT FROM ADDRESS BOOK
| TYPE | NAME |
|---|---|
| FTP | Tanaka |
| SMB | Ito |
| E-MAIL | Kato |

FIG. 7A

701 — PRESS START KEY TO START TRANSMISSION

702 — NUMBER OF DESTINATIONS:3

E-MAIL abc@xxx.com

SELECT FROM ADDRESS BOOK

DOCUMENT SIZE:A4

FIG. 7B

E-MAIL abc@xxx.com

SELECT FROM ADDRESS BOOK — 705

DOCUMENT SIZE:A4 — 703

COLOR MODE:COLOR — 704

TRANSMISSION METHOD:E-MAIL,FTP,SMB

RESOLUTION:300dpi — 706

READING METHOD: ONE-SIDED — 707

FILE FORMAT:PDF — 708

MULTI-PAGE FORMAT

SINGLE-PAGE FORMAT

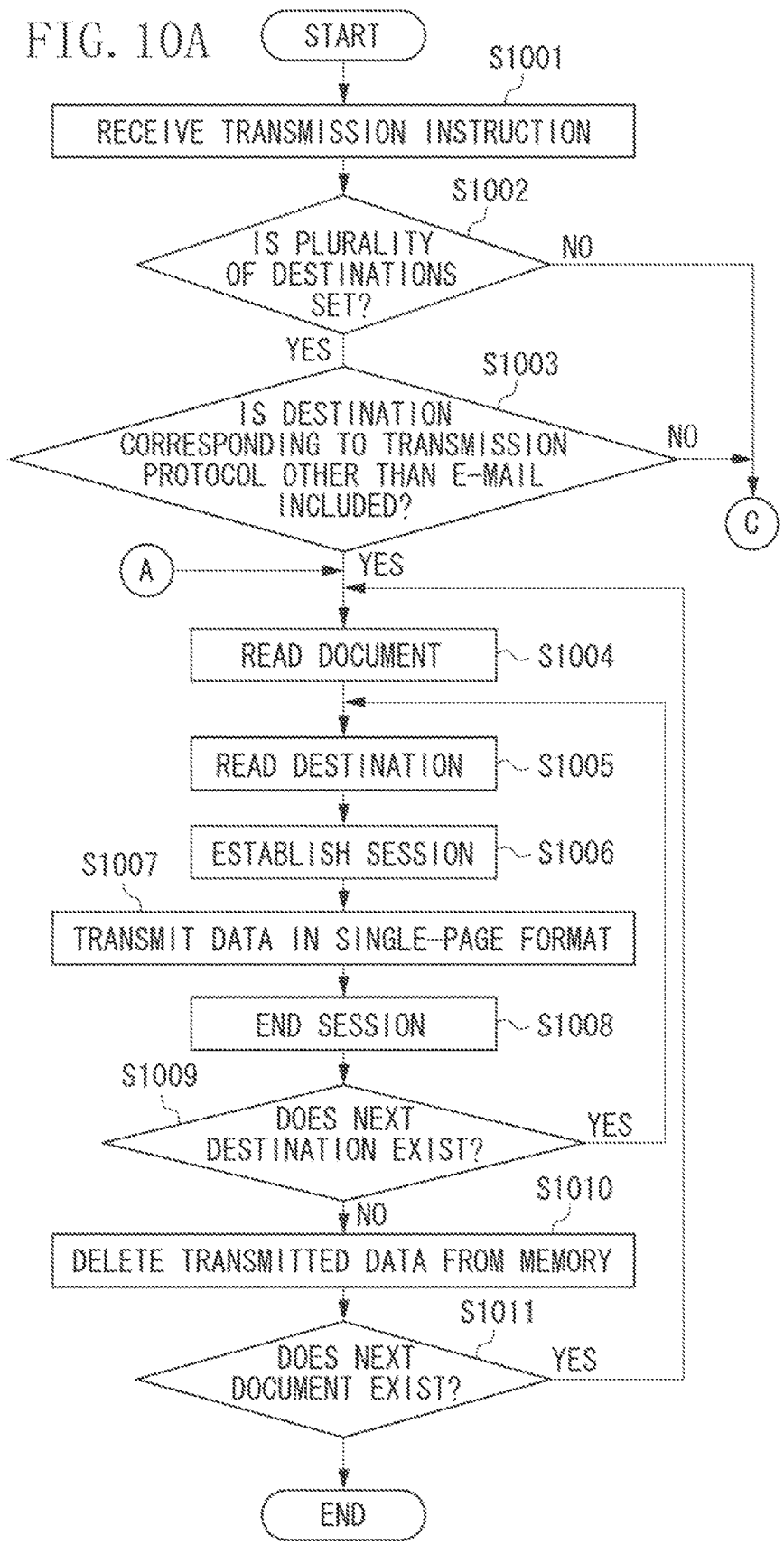

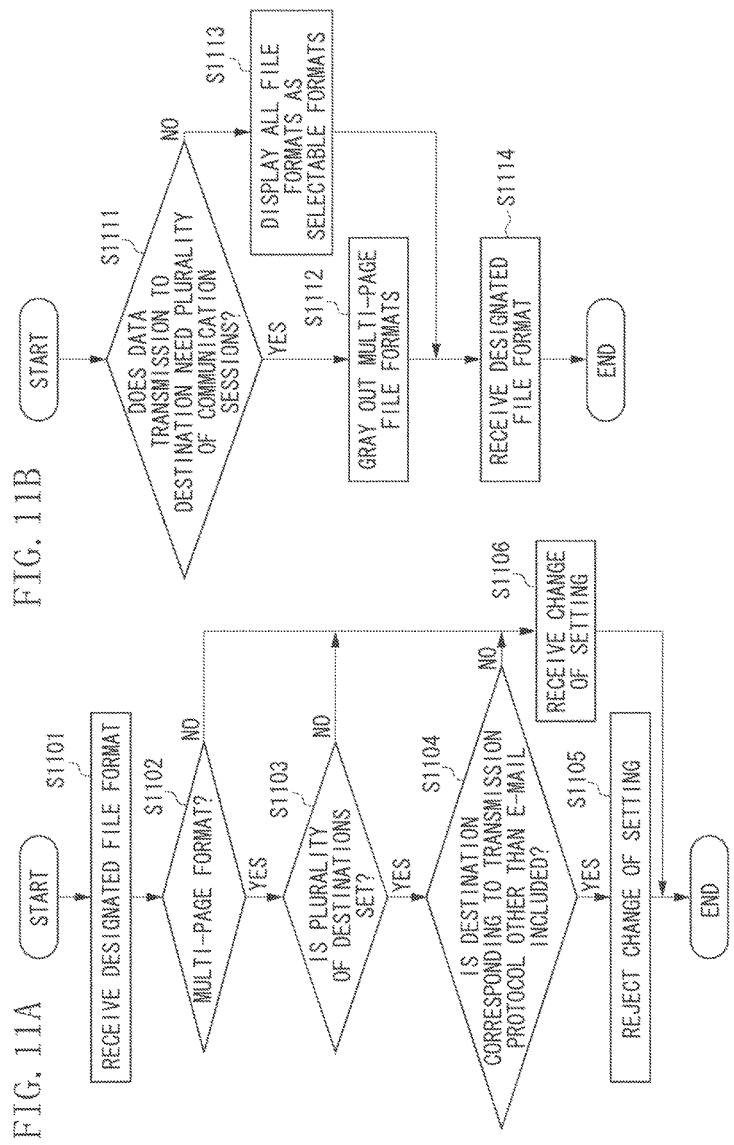

IMAGE PROCESSING APPARATUS, CONTROL METHOD THEREFOR, AND STORAGE MEDIUM FOR TRANSMITTING IMAGE DATA TO A PLURALITY OF DESTINATIONS

BACKGROUND OF THE INVENTION

Field of the Invention

The present invention relates to an image processing apparatus that transmits image data, a control method for the image processing apparatus, and a storage medium.

Description of the Related Art

Image processing apparatuses have conventionally been known that can transmit image data by using transmission protocols (transmission methods) for transmitting electronic mail and various types of files such as files corresponding to Server Message Block (SMB), File Transfer Protocol (FTP), and Distributed Authoring and Versioning protocol for the WWW (WebDAV).

These image processing apparatuses can transmit image data to a single destination or transmit common image data to a plurality of destinations that corresponds to the same transmission protocol (multi-address transmission). In addition, image processing apparatuses have also been known that can transmit common image data to a plurality of destinations that corresponds to transmission protocols different from each other (different-type multi-address transmission).

In addition, a method by which an apparatus with scarce hardware resources (in particular, a memory) such as an inexpensive image processing apparatus for consumer use transmits image data has conventionally been known (see Japanese Patent Application Laid-Open No. 2012-142680). In this method, each time the apparatus reads one page of documents, the apparatus transmits the image data of the read page (hereinafter, sequential transmission). In sequential transmission, image data that has been transmitted is deleted from the memory so that image data of a subsequent page can be stored in the memory. Thereby, even with a small memory capacity, a plurality of pages of image data can be transmitted.

By performing sequential transmission, even if an apparatus has insufficient memory resources, the apparatus can transmit a plurality of pages of image data without causing a memory-full state. However, in sequential transmission, when an apparatus transmits image data of the last page, image data of the first page has already been deleted from the memory. Thus, when a user wishes to transmit data to a plurality of destinations by using a transmission protocol that needs a communication session for each of the destinations, the user needs to perform the following operation. First, the user places documents on an image processing apparatus and sets the first destination. When the user presses the start key, the image processing apparatus establishes a communication session with the set first destination and reads one page of the documents. Each time the image processing apparatus reads a page, the image processing apparatus transmits the image data of the read page. After image data of all the pages is transmitted to this first destination, the image processing apparatus ends the session. Next, the user places the documents on the image processing apparatus again and sets the second destination. When the user presses the start key, the image processing apparatus establishes a new session and starts reading one page of the documents. Since the user needs to place the documents and set a destination repeatedly in this way, much time and effort are required.

SUMMARY OF THE INVENTION

The present invention is directed to a system that can transmit image data to a plurality of destinations with a simple operation while a user saves the memory usage.

An image processing apparatus according to the present invention includes a setting unit configured to set a destination, a reading unit configured to read a document and generate image data, a transmission unit configured to transmit image data, and a control unit configured to perform control such that, when a plurality of destinations that correspond to communication sessions different from each other is set by the setting unit, starting a communication session that corresponds to one of the plurality of destinations, transmitting image data of at least a part of a plurality of documents to the destination through the communication session, and ending the communication session are repeated until transmission to all the plurality of destinations is completed and, if another part of the plurality of documents exists, reading of another part of the plurality of documents is started.

Further features of the present invention will become apparent from the following description of exemplary embodiments with reference to the attached drawings.

BRIEF DESCRIPTION OF THE DRAWINGS

FIGS. 6A to 6C illustrate operation screens displayed by the MFP according to the first exemplary embodiment of the present invention.

FIGS. 7A and 7B illustrate operation screens displayed by the MFP according to the first exemplary embodiment of the present invention.

FIG. 10A is a flowchart illustrating a transmission operation of the MFP according to the first exemplary embodiment of the present invention.

FIGS. 11A and 11B are flowcharts each illustrating a file format setting operation of an MFP according to a second exemplary embodiment of the present invention.

DESCRIPTION OF THE EMBODIMENTS

Various exemplary embodiments, features, and aspects of the invention will be described in detail below with reference to the drawings.

The following exemplary embodiments do not limit the present invention defined by the claims. In addition, all the combinations of the features described in the exemplary embodiments are not necessarily essential for the solutions provided by the present invention.

Figure 1:
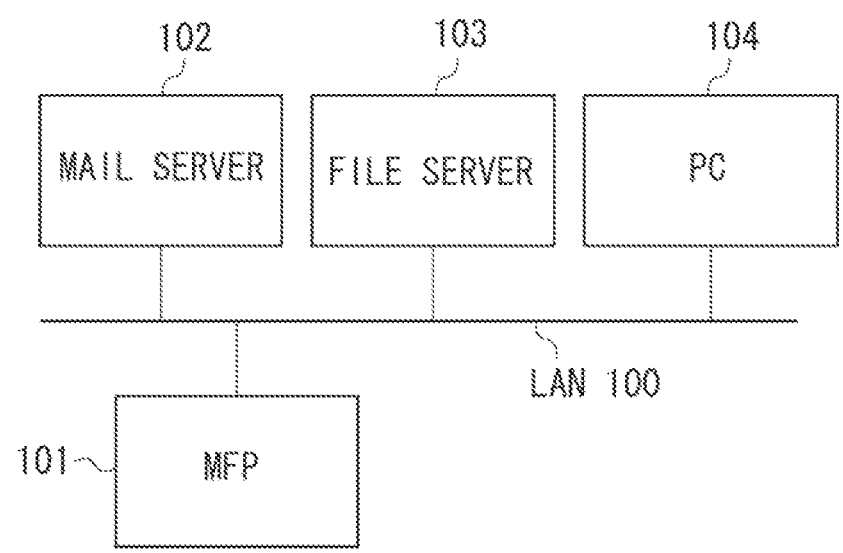
FIG. 1 illustrates an overall configuration of an image processing system according to a first exemplary embodiment of the present invention.

First, a first exemplary embodiment of the present invention will be described. FIG. 1 illustrates an overall configuration of an image processing system. On a local area network (LAN) 100, a multi function peripheral (MFP) 101, a mail server 102, a file server 103, and a personal computer (PC) 104 are mutually connected to communicate with each other. The MFP 101 is an example of an image processing apparatus.

In the present exemplary embodiment, while an MFP is used as an example of the image processing apparatus, an arbitrary apparatus other than an MFP such as a scanner having a single function may alternatively be used, if the apparatus has a function of reading documents and transmitting image data. For example, a smartphone, a tablet terminal, a digital camera, or the like that reads documents by using a camera function is also applicable.

The MFP 101 can transmit image data by electronic mail (e-mail) via the mail server 102. In addition, the MFP 101 can transmit an image data file to a folder in the file server 103 as a destination. In such a case, for example, Server Message Block (SMB), File Transfer Protocol (FTP), or Distributed Authoring and Versioning protocol for the WWW (WebDAV) is used.

Since a destination corresponding to each of the above transmission protocols can be registered in an address book which will be described below, the user can avoid the trouble of manually entering a destination per transmission. For example, the user can register a destination in the address book by operating an operation unit of the MFP 101 or by remotely operating the MFP 101 via a web browser of the PC 104.

The image processing system includes the MFP 101, the mail server 102, the file server 103, and the PC 104. However, the image processing system may include only the MFP 101 and the file server 103, or only the MFP 101.

Figure 2:
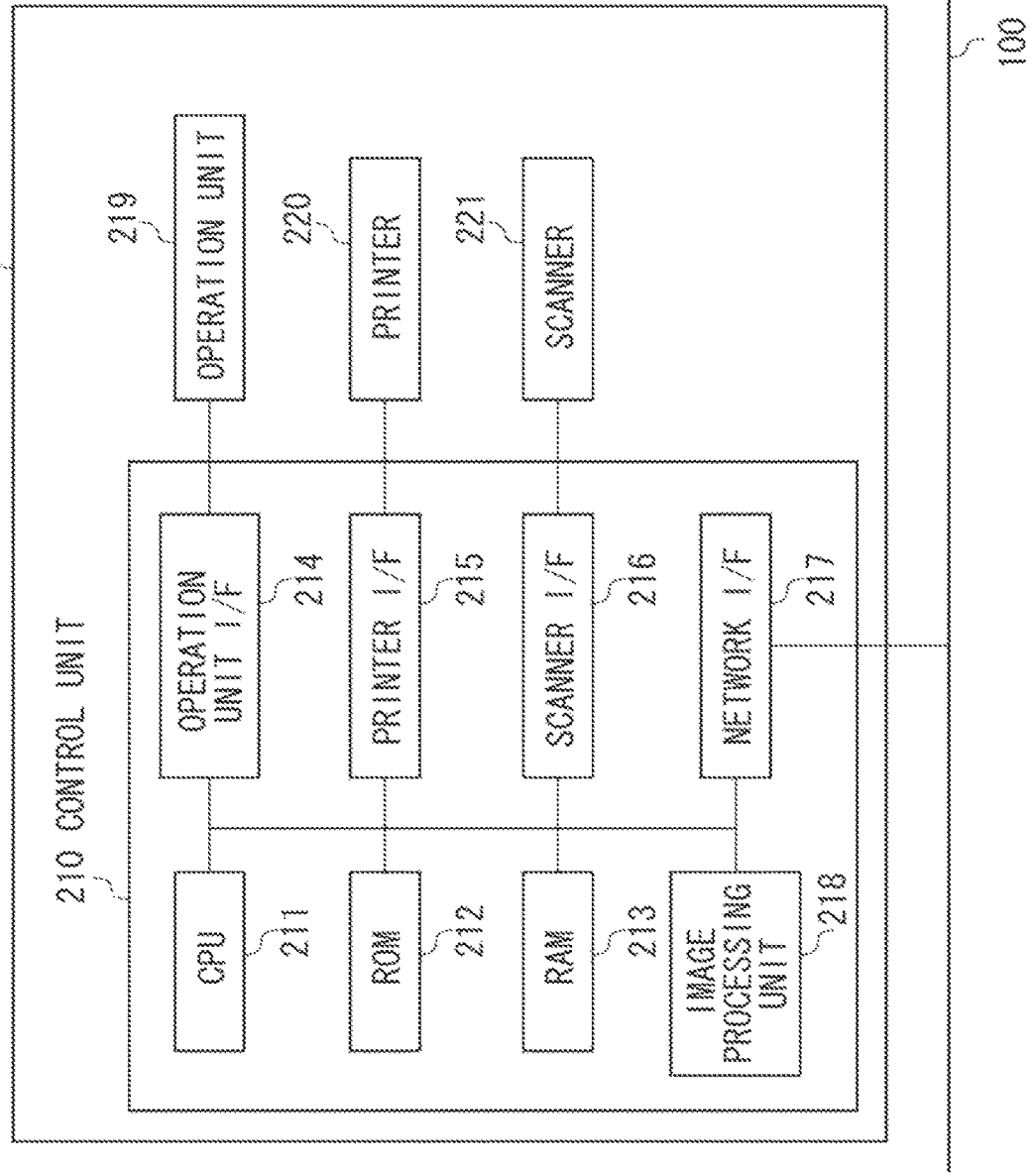
FIG. 2 is a block diagram illustrating a configuration of a multi function peripheral (MFP) according to the first exemplary embodiment of the present invention.

FIG. 2 is a block diagram illustrating a hardware configuration of the MFP 101. A control unit 210 including a central processing unit (CPU) 211 controls an overall operation of the MFP 101. The CPU 211 performs various types of control such as reading and communication by reading control programs stored in a read-only memory (ROM) 212. A random access memory (RAM) 213 is a main storage memory of the CPU 211 and is used as a temporary storage area for image data and various control programs. In addition, the RAM 213 includes a nonvolatile auxiliary storage area for storing user setting information and address book information which will be described below. In the MFP 101, a single CPU 211 executes, by using a single memory (RAM 213), the processing illustrated in each of the flowcharts in FIGS. 10 to 12 which will be described below. However, alternatively, other configurations may be applicable. For example, the processing illustrated in each of the flowcharts in FIGS. 10 to 12 may be executed by causing a plurality of CPUs and a plurality of RAMs, ROMs, and hard disk drives (HDDs) to work together. Alternatively, part of the processing may be executed by using a hardware circuit.

An operation unit interface (I/F) 214 connects an operation unit 219 to the control unit 210. The operation unit 219 functions as a reception unit that receives user instructions.

A printer I/F 215 connects a printer 220 to the control unit 210. Image data to be printed by the printer 220 is forwarded from the control unit 210 via the printer I/F 215, and the printer 220 prints the image data on a recording medium such as a sheet.

A scanner I/F 216 connects a scanner (a reading unit) 221 to the control unit 210. The scanner 221 reads a document set on the MFP 101, generates image data (an image file), and forwards the image data to the RAM 213 in the control unit 210 via the scanner I/F 216. The MFP 101 can transmit the image data generated by the scanner 221 by using various transmission protocols. The MFP 101 can also forward the image data generated by the scanner 221 to the printer 220, which prints the image data.

In practice, an image processing unit 218 in the control unit 210 converts the image data generated by the scanner 221 into a file format to be used for file transmission, printing, or the like as appropriate. While in the present exemplary embodiment, it is assumed that an image data storage area (image memory) for storing image data is ensured in the RAM 213, image data may be stored in an auxiliary storage device such as an HDD, depending on the hardware configuration.

A network I/F 217 connects the control unit 210 (the MFP 101) to the LAN 100. The network I/F 217 transmits image data and information to external apparatuses (the mail server 102, the file server 103, the PC 104, etc.) on the LAN 100 and receives various types of information from external apparatuses on the LAN 100.

Figure 3:
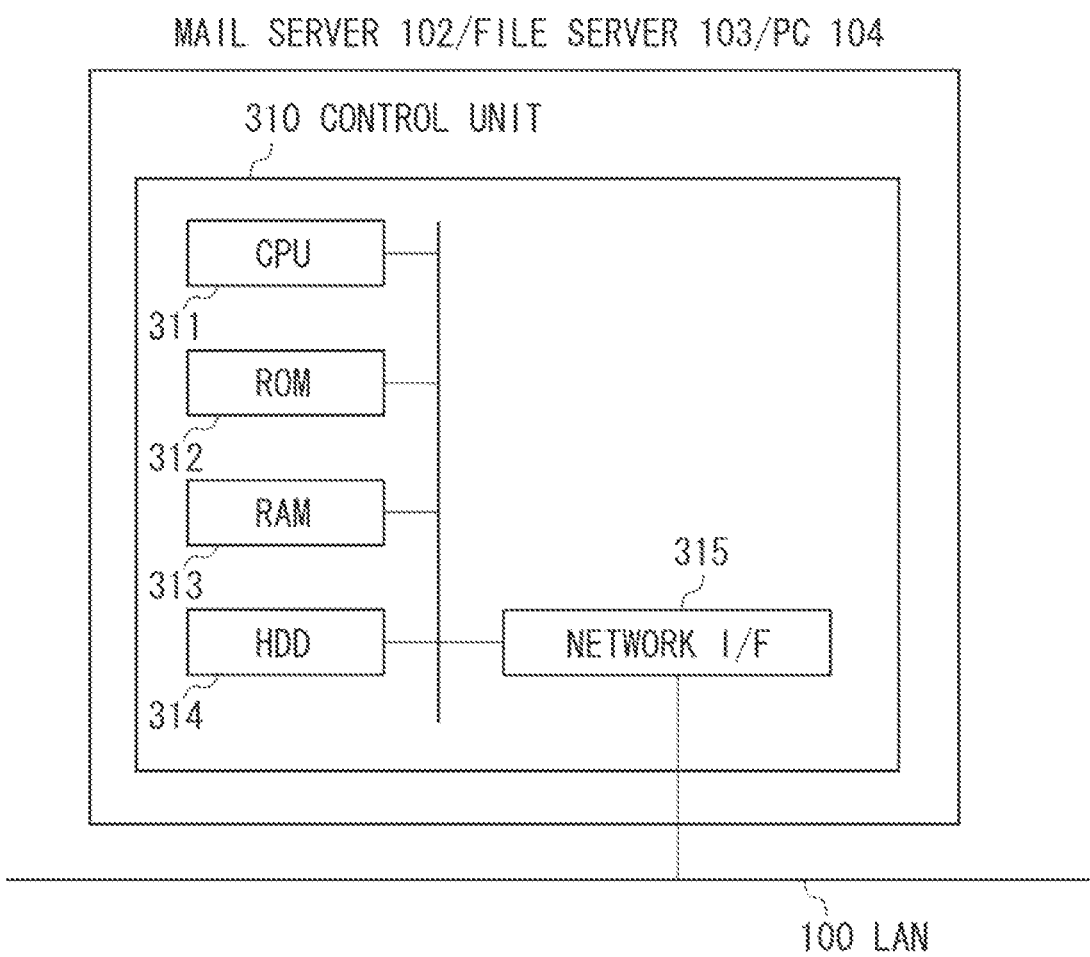
FIG. 3 is a block diagram illustrating a configuration of each of a mail server, a file server, and a personal computer (PC) according to the first exemplary embodiment of the present invention.

FIG. 3 is a block diagram illustrating a configuration of the mail server 102. A control unit 310 including a CPU 311 controls an overall operation of the mail server 102. The CPU 311 performs various types of control by reading control programs stored in a ROM 312 or an HDD 314. A RAM 313 is used as a main memory of the CPU 311. The RAM 313 is also used as a temporary storage area such as a work area. The HDD 314 is used as an auxiliary storage area that stores various programs and data.

A network I/F 315 connects the control unit 310 (the mail server 102) to the LAN 100. The network I/F 315 transmits/receives various types of information to/from other apparatuses on the LAN 100. Since the configuration of the file server 103 is similar to that of the mail server 102, description thereof will be omitted. In addition to the configuration of the mail server 102, the PC 104 includes a unit such as a display for displaying an operation screen and an operation unit such as a keyboard or a mouse for receiving user operations. The mail server 102 and the file server 103 may also include a display unit and an operation unit similar to those in the PC 104.

Figure 4:
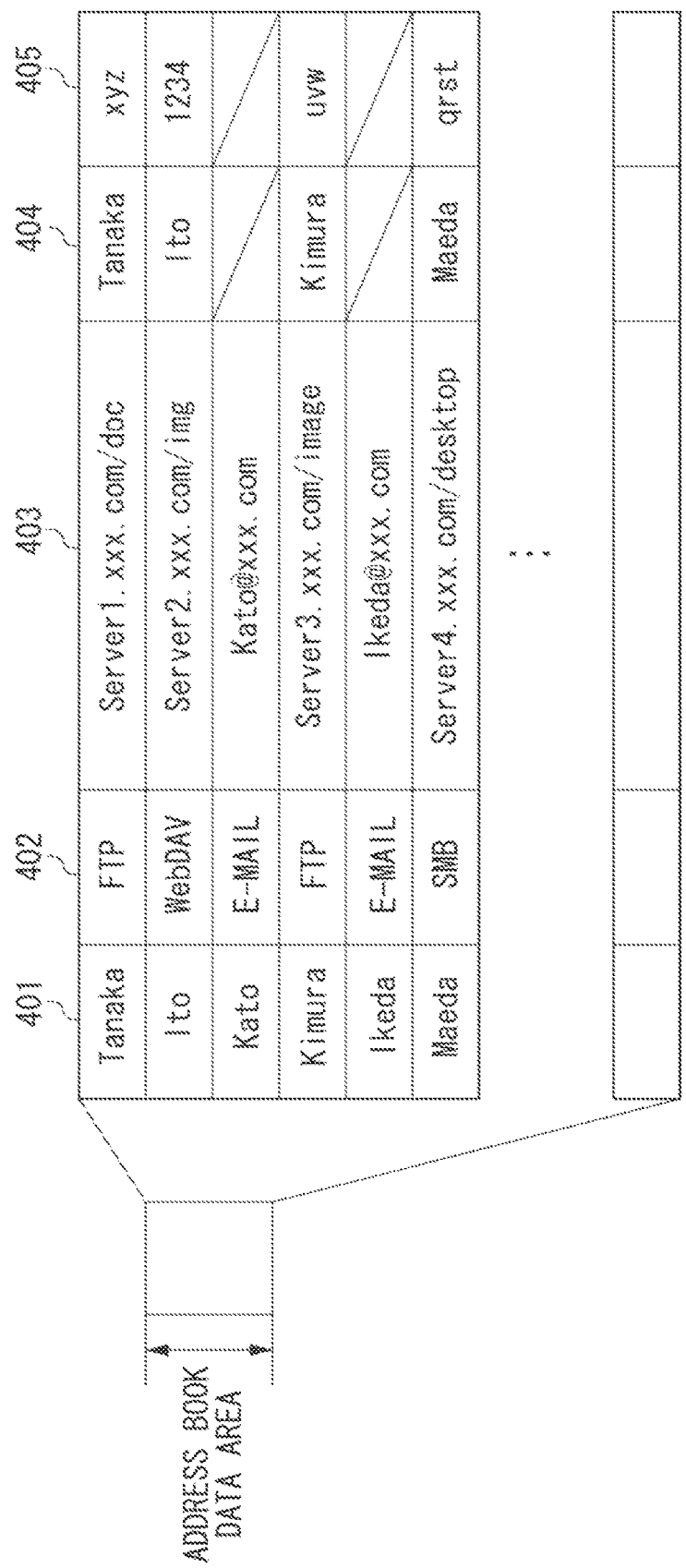
FIG. 4 illustrates a configuration of address book data according to the first exemplary embodiment of the present invention.

FIG. 4 is a schematic configuration view of the address book data stored in the RAM 213 in the MFP 101. In the address book data area, data of information 401 to 405 is stored.

In the information 401, destination names to be displayed at the time when the address book is presented to the user are stored. In the information 402, types of transmission protocol (communication method) are stored. In FIG. 4, one of SMB, FTP, WebDAV, and e-mail (SMTP) is stored in each row. However, transmission protocols other than these protocols may be included.

In the information 403, destination information is stored. If the transmission protocol in a row is SMB, FTP, or WebDAV, a host name and a folder path of a file server are used as the destination information. If the transmission protocol is e-mail, an e-mail address is used as the destination information. In FIG. 4, the destination information corresponding to each transmission protocol is stored in the information 403 in the same field. However, the structure of storing the destination information is not limited to this. For example, the destination information may be stored in a different field. A pointer referring to such destination information that is stored in a different area may be stored.

If the transmission protocol in a row is SMB, FTP, or WebDAV, authentication information (a user name and a password), which is necessary for accessing a folder in which target image data is stored, is stored in the information 404 and 405. If the transmission protocol is e-mail, since no authentication information is necessary, the fields of the information 404 and 405 are not used.

Figure 5:
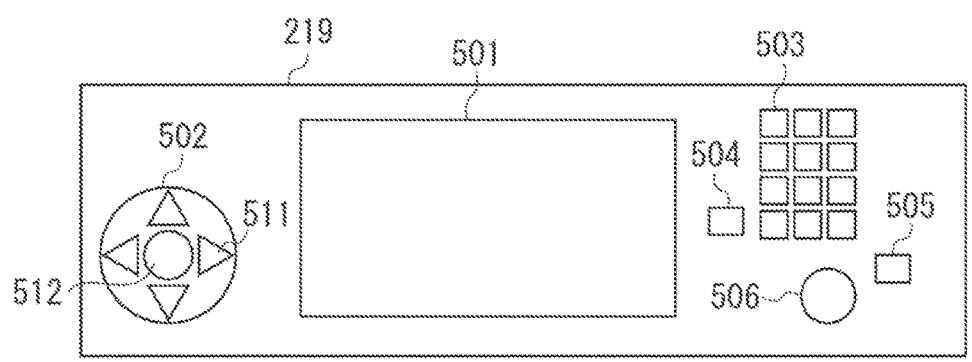
FIG. 5 illustrates an operation unit of the MFP according to the first exemplary embodiment of the present invention.

FIG. 5 illustrates the operation unit 219 for receiving user instructions. The operation unit 219 includes a display unit 501, selection keys 502, a numeric keypad 503, a reset key 504, a stop key 505, and a start key 506. In the present exemplary embodiment, as an example, the operation unit 219 includes the keys 502 to 506 as hardware keys. However, other types of keys may be applicable if the operation unit 219 includes a function of selecting information input from the user. For example, by allowing the display unit 501 to have a touch panel function, at least one of the hardware keys may be configured as a software key.

The display unit 501 displays a screen to the user. The selection keys 502 include scroll keys 511 for selecting an option displayed on the display unit 501 and a determination key 512 for determining an option selected by the scroll keys 511. The user can designate one of the options by using the scroll keys 511 and the determination key 512.

The numeric keypad 503 are keys for directly entering a number such as a copy number. The numeric keypad 503 is also used for entering one-byte alphanumeric characters when the user sets a destination, for example. The reset key 504 is a key for clearing a state in the middle of setting and redoing the setting. The start key 506 is used when the user instructs the MFP 101 to start various jobs such as reading and copying of documents.

FIGS. 6A to 6C illustrate screens displayed by the display unit 501. The user operates the selection keys 502 to select a function 601 or 602 in FIG. 6A. In FIG. 6A, "Scan and Transmit" and "Copy" are shown as the functions 601 and 602, respectively. However, the MFP 101 may include functions other than these functions.

If the user designates the function 601, the screen shifts to a setting screen for a destination and an image reading profile as illustrated in FIG. 6B. FIG. 6B illustrates the screen displayed by the display unit 501 at the time when the user designates the function 601.

If the user designates an area 603, the MFP 101 can receive a new destination entered by the user. The user uses the numeric keypad 503 to enter a new destination. If the user designates a function 604, the display unit 501 displays an address book screen including the address book data stored in the RAM 213. FIG. 6C illustrates the address book screen on which destinations corresponding to e-mail, SMB, FTP, and WebDAV are displayed. The user can set at least one destination from the destinations displayed on the address book screen. While the destination names and types (transmission protocols) are displayed on the address book screen in this exemplary embodiment, other information may be displayed.

After the user makes settings on the screens in FIGS. 6A to 6C, the display unit 501 displays a transmission screen illustrated in FIG. 7A. FIG. 7A illustrates a transmission screen on which three destinations are set. Information 701 is used for notifying the user that reading of a document and transmission of the image data can be started when the start key 506 is pressed. Information 702 is used for notifying the user of the number of set destinations. The transmission screen continues to be displayed until the user presses the start key 506. If the start key 506 is not pressed, the MFP 101 waits until the user sets an additional destination (multi-address transmission destination).

FIG. 7B illustrates a list of options displayed by the display unit 501. In practice, some of the options are displayed by the display unit 501 when the user operates the scroll keys 511.

The initial settings of functions 703 to 708 are uniquely determined by the apparatus or are made by an administrator of the MFP 101.

The function 703 is used for notifying the user of the current document size and is used when the user changes the setting of the document size. The function 704 is used for notifying the user of the current color mode and is used when the user changes the setting of the color mode.

The function 705 is used for notifying the user of the current transmission protocol. Since the user cannot change the transmission protocol without changing a destination, in the present exemplary embodiment, the transmission protocol cannot be changed. The function 705 may be provided with a function of canceling a set destination. In such a case, if the user designates the function 705, a list of set destinations is displayed (not illustrated). The user can designate one of a plurality of destinations displayed in the list and cancel data transmission to the destination.

The function 706 is used for notifying the user of the current setting of reading resolution and is used when the user changes the setting of the resolution. The function 707 is used for notifying the user of the current reading method and is used when the user changes the setting between one-sided reading and two-sided reading.

Figure 8A:
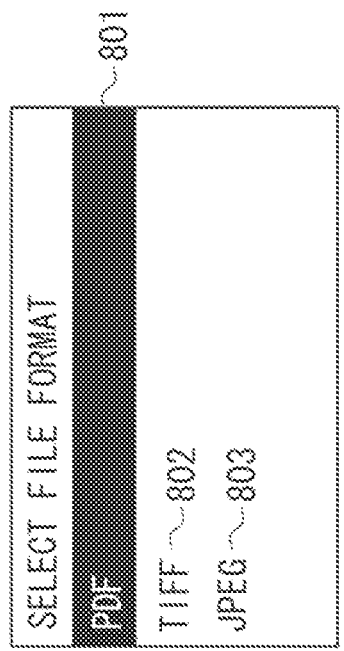
FIGS. 8A and 8B illustrate operation screens displayed by the MFP according to the first exemplary embodiment of the present invention.
Figure 8B:
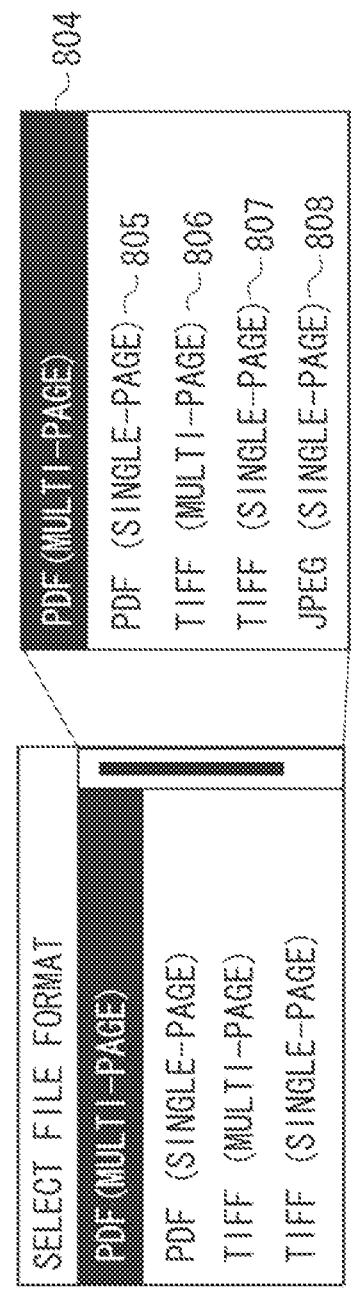

The function 708 is used for notifying the user of the current file format (image data format) and is used when the user changes the setting of the file format. If the user designates the function 708, a file format setting change screen is displayed. FIGS. 8A and 8B illustrate screens for designating a file format of image data to be transmitted. While FIG. 8A only illustrates Portable Document Format (PDF), Tagged Image File Format (TIFF), and Joint Photographic Experts Group (JPEG) as options, other file formats may also be included as options.

If the user selects PDF or TIFF and if the MFP 101 reads a plurality of pages of documents (a plurality of documents), image data of the plurality of pages is stored in a single file (a multi-page format). In contrast, if the user selects JPEG, image data of one page is stored in a single file (a single-page format). Alternatively, the MFP 101 may be configured to allow the user to select whether to use the multi-page format or the single-page format when the user selects PDF or TIFF.

Further alternatively, as illustrated by functions 804 to 808 in FIG. 8B, the MFP 101 may be configured to allow the user to simultaneously designate a file format and a page format (the multi-page format or the single-page format).

Figure 9A:
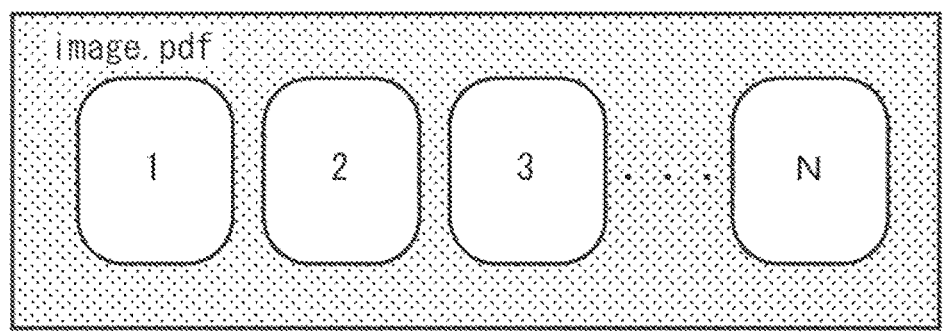
FIGS. 9A and 9B are conceptual diagrams of page formats according to the first exemplary embodiment of the present invention.
Figure 9B:
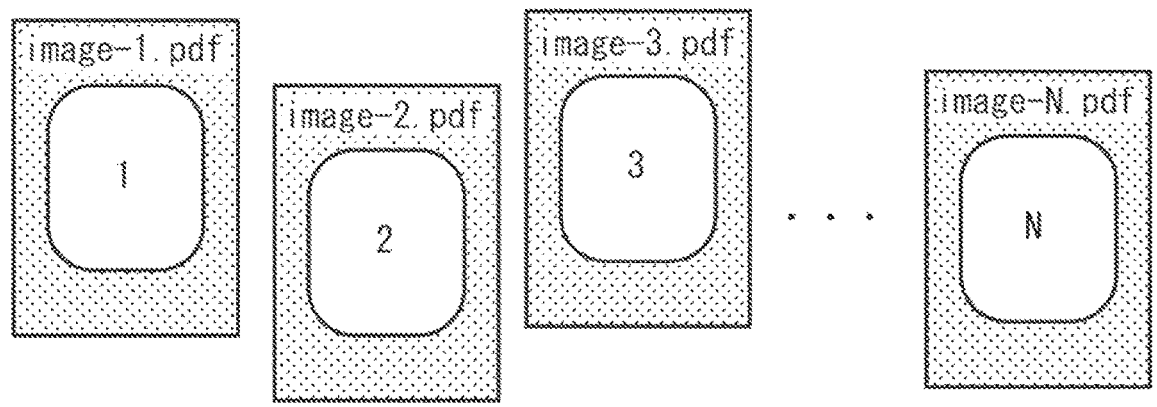

FIGS. 9A and 9B are conceptual diagrams of file formats to be used at the time when the MFP 101 reads a plurality of pages (N pages in FIGS. 9A and 9B) of documents. If the user designates the function 804 "PDF (multi-page)" or the function 806 "TIFF (multi-page)," a plurality of pages of image data is stored in a single file. For example, as illustrated in FIG. 9A, a plurality of pages of image data from page 1 to page N is stored in a single file having a file name "image.pdf."

In contrast, if the user designates the function 805 "PDF (single-page)," the function 807 "TIFF (single-page)," or the function 808 "JPEG (single-page)," a single page of image data is stored in a single file. For example, as illustrated in FIG. 9B, image data of page 1 is stored in a file having a file name "image-1.pdf." In addition, image data of page 2 is stored in a file having a file name "image-2.pdf" and image data of page N is stored in a file having a file name "image-N.pdf."

Next, a case where a single file is transmitted to a destination will be described. To transmit a single file to a destination, it is necessary to maintain a communication session with the destination until the single file is transmitted. If the file to be transmitted is in the multi-page format, it is necessary to maintain the communication session until image data of all the pages of documents is transmitted. In contrast, if the file in the single-page format is transmitted, the MFP 101 may end the communication session after transmitting a single file storing a single page of image data. Namely, after establishing a communication session with the destination and transmitting the file "image-1.pdf," the MFP 101 may temporarily end the communication session. Thereafter, the MFP 101 can transmit the next page "image-2.pdf" by establishing a communication session with the destination again. By repeating this operation, the MFP 101 can transmit image data of all the documents, without maintaining a communication session.

Figure 10B:
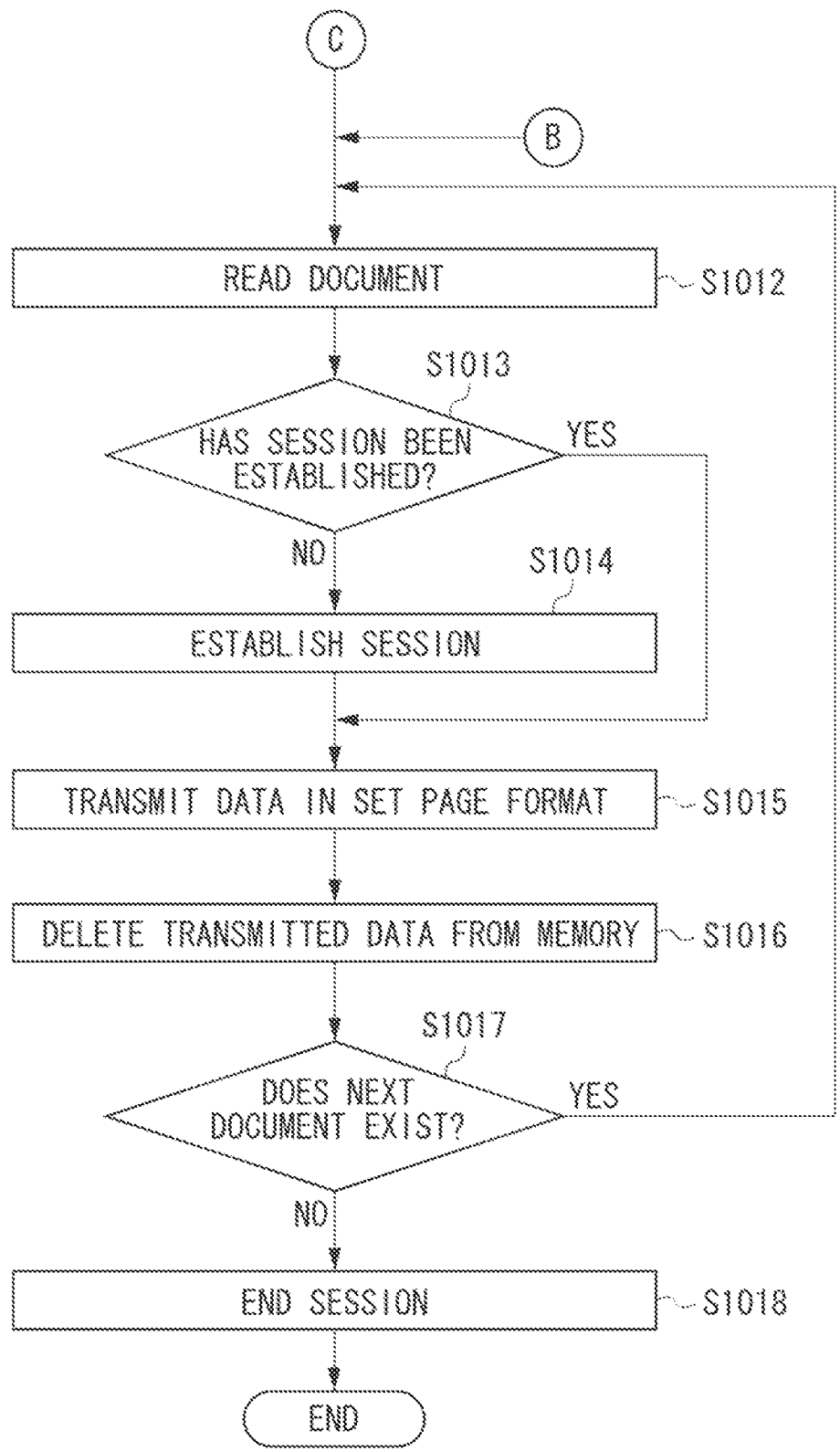
FIG. 10B is a flowchart illustrating a transmission operation of the MFP according to the first exemplary embodiment of the present invention.

FIG. 10 is a flowchart illustrating the transmission control of image data of the MFP 101. Each operation (step) illustrated in the flowchart in FIG. 10 is realized by causing the CPU 211 in the MFP 101 to execute a control program stored in the ROM 212 or the RAM 213.

If the user presses the start key 506 while the display unit 501 is displaying the transmission screen in FIG. 7A, the CPU 211 starts transmission processing. In step S1001, the CPU 211 receives a transmission instruction given by the pressing of the start key 506. In step S1001, the CPU 211 may determine whether at least one destination is set. In this case, if at least one destination is set, the processing proceeds to step S1002. If not, the CPU 211 causes the display unit 501 to display an error message such as "Please set a destination" and shift the screen to the setting screen for a destination and an image reading profile (FIG. 6B).

Next, the CPU 211 determines whether the MFP 101 needs to establish a plurality of communication sessions to transmit the image data to the set destination(s). If any one of the protocols SMB, FTP, and WebDAV is used, the MFP 101 needs to establish a single communication session for a single destination. Namely, if the user sets a plurality of destinations which includes at least one destination that corresponds to any one of these transmission protocols, the MFP 101 needs to establish a plurality of communication sessions. In contrast, e-mail (SMTP) is a transmission protocol which enables transmission of image data to a plurality of destinations through a single communication session between the client (the MFP 101) and the mail server 102. The mail server 102 makes copies of the e-mail data including image data and distributes these copies to the destinations. Thus, even when the user sets a plurality of destinations, if all the destinations are e-mail destinations, the MFP 101 can transmit the data through a single communication session. In light of this, in steps S1002 and S1003, the CPU 211 determines whether a plurality of communication sessions is needed.

In step S1002, the CPU 211 determines whether a plurality of destinations is set. If so (YES in step S1002), the processing proceeds to step S1003. If only one destination is set (NO in step S1002), the processing proceeds to step S1012. In step S1003, the CPU 211 determines whether the plurality of destinations includes a destination that corresponds to a transmission protocol other than e-mail. If the plurality of destinations does not include a destination that corresponds to a transmission protocol other than e-mail, namely, if all the plurality of destinations correspond to e-mail (NO in step S1003), the processing proceeds to step S1012. If a destination that corresponds to a transmission protocol other than e-mail is included (YES in step S1003), the processing proceeds to step S1004. In the present exemplary embodiment, only e-mail is used as a transmission protocol that enables transmission of data to a plurality of destinations through a single communication session. However, other than e-mail, an arbitrary transmission protocol that enables transmission of data to a plurality of destination through a single communication session may be used. In the present exemplary embodiment, if the CPU 211 determines that all the destinations correspond to a single transmission protocol that enables transmission of data to a plurality of destinations through a single communication session, the processing proceeds to step S1012.

In FIG. 10, the CPU 211 determines whether a plurality of communication sessions is needed in steps S1002 and S1003. However, the present invention is not limited to such an example. For example, the determination may be made as follows. First, the CPU 211 determines whether the set destination(s) includes a destination that corresponds to a transmission protocol other than e-mail. If a destination that corresponds to a transmission protocol other than e-mail is included, the CPU 211 determines whether a plurality of destinations is set. If a destination that corresponds to a transmission protocol other than e-mail is not included, the processing proceeds to step S1012. If the CPU 211 determines that a plurality of destinations is set, the processing proceeds to step S1004. If the CPU 211 determines that only one destination is set, the processing proceeds to step S1012.

The determinations in steps S1002 and S1003 may be made each time the user sets a destination via the area 603 or the function 604. In this case, if the result of the determination made at the time when the user sets a destination indicates that a plurality of communication sessions is needed, the processing proceeds to step S1004. If not, the processing proceeds to step S1012.

If the CPU 211 determines that transmission of the image data needs a plurality of communication sessions as a result of the determinations in steps S1002 and S1003, the CPU 211 performs transmission in accordance with steps S1004 to S1011. In this case, regardless of the page format designated on the screen in FIG. 8A or 8B, the MFP 101 transmits the image data in the single-page format. However, if the CPU 211 determines that transmission of the image data does not need a plurality of communication sessions, the CPU 211 performs transmission in accordance with steps S1012 to S1018. In this case, the MFP 101 transmits the image data in accordance with the page format designated on the screen in FIG. 8A or 8B.

In step S1004, the CPU 211 controls the scanner 221 to read one page of the documents and causes the image processing unit 218 to convert the read image data into a file. In addition, the CPU 211 stores the file in the image data storage area (a storage unit) in the RAM 213.

If two-sided reading is set via the function 707, one side of a document is read as the first page and is stored in the RAM 213. Next, the document is reversed and the other side of the document is read as the second page. If image data of two pages can be stored in the image data storage area in the RAM 213, a scanner that can read two sides simultaneously may be used.

Steps S1005 to S1009 correspond to a transmission control operation in which one page of image data converted into the single-page format is transmitted to each of a plurality of destinations by using a communication session per destination. In step S1005, the CPU 211 reads one of the set destinations.

In step S1006, the CPU 211 establishes a communication session between the MFP 101 and the destination by using a transmission protocol that corresponds to the destination read in step S1005. If e-mail (SMTP) is used as the transmission protocol, the CPU 211 establishes a communication session with the mail server 102 previously set by the MFP 101.

In step S1007, the CPU 211 transmits one page of image data stored in the RAM 213 to the destination with which the MFP 101 has established a communication session. In step S1008, the CPU 211 ends the communication session that has been established between the MFP 101 and the destination. In step S1009, the CPU 211 determines whether another destination to which the image data needs to be transmitted exists. If such a destination exists (YES in step S1009), the processing returns to step S1005. Subsequently, the CPU 211 transmits the image data to this destination. If there is no such destination (NO in step S1009), the processing proceeds to step S1010. In step S1010, the CPU 211 deletes the transmitted image data (frees the memory area).

The MFP 101 may be configured to stop transmitting image data under certain conditions. For example, if the CPU 211 detects a destination to which the image data cannot be transmitted in any one of steps S1005 to S1008, the CPU 211 may determine that the image data of the subsequent pages is not transmitted to this destination.

In step S1011, the CPU 211 determines whether the next document exists. If so (YES in step S1011), the processing returns to step S1004, and the CPU 211 transmits image data of the next page to the plurality of destinations in accordance with steps S1004 to step S1010. If the next document does not exist (NO in step S1011), the CPU 211 ends the transmission operation.

In the present exemplary embodiment, for ease of description, operations of reading documents and transmitting the image data of the documents have been described with a single flowchart. However, alternatively, these operations may be performed independently. For example, in step S1004, a first control program may read a document and store the generated image data in the RAM 213. In addition, a second control program monitors the image data storage area in the RAM 213. If the second control program detects storage of image data, the second control program performs steps S1005 to S1011. When the first control program detects that a free space has been made in the image data storage area (transmitted image data has been deleted), the first control program starts to read the next page.

If image data of two pages can be stored in the image data storage area, the CPU 211 can start to read the next page before transmission of the image data of the previous page is completed. In this case, since transmission of the image data of the N-th page and reading of the (N+1)th page of the documents can be performed in parallel, the operation time can be shortened. In addition, if a plurality of pages of image data can be stored in the image data storage area, the MFP 101 may be configured such that a plurality of pages of image data (some of a plurality of documents) can be transmitted per communication session. For example, when the free space in the image data storage area reaches a predetermined size or less, the first control program may notify the second control program of an instruction to start transmission. In addition, for example, when the second control program detects that image data has been stored in the image data storage area, the second control program transmits all the image data stored in the image data storage area at this point in accordance with steps S1005 to S1011.

In step S1012, as in step S1004, the CPU 211 causes the scanner 221 to read one page of the documents and causes the image processing unit 218 to convert the read image data into a file. In addition, the CPU 211 stores the file in the image data storage area in the RAM 213. In step S1012, unlike in step S1004, the image processing unit 218 converts the image data into a file in accordance with the setting entered by the user via the screen in FIG. 8A or 8B. If the user sets a multi-page format, the image data is converted as part of the data stored in a file. If the user sets a single-page format, the image data is converted as a single file.

In step S1013, the CPU 211 determines whether a communication session has been established between the MFP 101 and the destination. If so (YES in step S1013), the processing proceeds to step S1015. If no communication session has been established (NO in step S1013), the processing proceeds to step S1014. In step S1014, the CPU 211 establishes a communication session between the MFP 101 and the destination by using the transmission protocol that corresponds to the set destination. If e-mail (SMTP) is used as the transmission protocol, the CPU 211 establishes a communication session with the mail server 102 previously set by the MFP 101.

In step S1015, the CPU 211 transmits the one page of image data stored in the RAM 213 to the set destination. In step S1016, the CPU 211 deletes the image data transmitted in step S1015 (frees the memory area).

In step S1017, the CPU 211 determines whether the next document exists. If the next document exists (YES in step S1017), the processing returns to step S1012, and the CPU reads image data of the next page and transmits the image data in accordance with steps S1012 to S1016. In step S1017, if the next document does not exist (NO in step S1017), the processing proceeds to step S1018, and the CPU 211 ends the communication session established between the MFP 101 and the destination.

As described above, according to the present exemplary embodiment, the MFP 101 establishes a communication session with a destination, transmits one page of image data, and ends the communication session with the destination in accordance with steps S1004 and S1011. This series of steps is repeated for each of the destinations. Next, by using such a communication session established for each destination, the operation of transmitting image data to each destination is repeated for each of the pages. Consequently, even when the MFP 101 transmits a plurality of pages of image data to a plurality of destinations that correspond to communication sessions different from each other, the MFP 101 can prevent an increase in memory usage and in the number of reading operations.

In addition, according to the present exemplary embodiment, the MFP 101 can appropriately switch its transmission control operation, depending on whether transmission of image data needs a plurality of communication sessions. If the MFP 101 can transmit image data to a destination through a single communication session, each time the MFP 101 reads one page of documents, the MFP 101 transmits the image data to the destination with which the MFP 101 has established a communication session. After the MFP 101 transmits all the image data, the MFP 101 ends the communication session. In this way, if the MFP 101 can transmit image data through a single communication session, the MFP 101 can transmit the image data in accordance with a file format (including a multi-page format) set by the user.

Next, a second exemplary embodiment of the present invention will be described. In the first exemplary embodiment, if the MFP 101 needs to establish a plurality of communication sessions, the MFP 101 transmits one page of image data in a single-page format while switching communication sessions. If the MFP 101 does not need to establish a plurality of communication sessions, the MFP 101 performs communication session control in which image data is transmitted in a set file format to a destination(s) with which the MFP 101 has established a communication session.

The second exemplary embodiment includes an operation in addition to those described in the first exemplary embodiment. More specifically, the MFP 101 according to the second exemplary embodiment performs setting control that is more convenient for the user when the user sets a file format (an image data format) (a reception unit). In the second exemplary embodiment, the same configurations as those in the first exemplary embodiment are denoted by the same reference numerals, and detailed description thereof will be omitted.

The user sets a file format on the setting screen for a destination and an image reading profile (FIG. 6B) or on the transmission screen by operating the function 708 (FIG. 7A). The user can change the setting as many times as the user wishes until the start key 506 is pressed.

In the first exemplary embodiment, if the user sets a plurality of destinations for which the MFP 101 needs to establish a plurality of communication sessions and the user wishes to transmit a plurality of pages of image data, the MFP 101 transmits the image data in a single-page format, regardless of the setting made by the user. Namely, even if the user sets a multi-page format, the MFP 101 transmits the image data in a single-page format, contrary to the user's intention. In the present exemplary embodiment, when the user makes transmission settings, the MFP 101 prohibits the user from making a combination of settings with which transmission cannot be performed. Thereby, the MFP 101 can perform setting control that is more convenient for the user.

FIG. 11 is a flowchart illustrating control to be performed at the time when the user sets a file format on the MFP 101. Each operation (step) illustrated in the flowchart in FIG. 11 is realized by causing the CPU 211 in the MFP 101 to execute a control program stored in the ROM 212 or the RAM 213. If the user designates the function 708 (the file format in FIG. 7B), the processing proceeds to step S1101 in FIG. 11A. In step S1101, the CPU 211 receives the designated file format. In step S1102, the CPU 211 determines whether the page format of the file format designated in step S1101 is a multi-page format. If the page format is not a multi-page format (NO in step S1102), the processing proceeds to step S1106. If the page format is a multi-page format (YES in step S1102), the processing proceeds to step S1103.

In steps S1103 and S1104, as in the above steps S1002 and S1003, the CPU 211 determines whether a plurality of communication sessions is needed. If a plurality of communication sessions is not needed (NO in step S1103 or S1104), the processing proceeds to step S1106, and the CPU 211 receives the change of the file setting. If a plurality of communication sessions is needed (YES in step S1104), the processing proceeds to step S1105. In step S1105, the display unit 501 displays, to the user, a screen that does not receive the change of the setting to the file format designated by the user. Next, the CPU 211 ends the file setting without changing the setting.

In addition, the destination setting control is not limited to that in the flowchart illustrated in FIG. 11A. Alternatively, the destination setting control may be realized by a flowchart as illustrated in FIG. 11B. In such a case, if the user designates the function 708, the processing proceeds to step S1111 in FIG. 11B.

In step S1111, the CPU 211 determines whether a plurality of communication sessions is needed to transmit data to a set destination(s). This step S1111 corresponds to the above steps S1002 and S1003. If the CPU 211 determines that a plurality of communication sessions is needed (YES in step S1111), the processing proceeds to step S1112. If not (NO in step S1111), the processing proceeds to step S1113.

In step S1112, the file formats of the multi-page formats are grayed out while the file formats of the single-page formats are displayed as selectable formats. In contrast, in step S1113, all the file formats are displayed as selectable formats. In step S1114, the CPU 211 receives a file format designated by the user. The destinations that correspond to the grayed-out formats cannot be selected. If a page format is selected after the above file format is set (FIG. 8A), the CPU 211 may perform control such that the multi-page formats are grayed out on the page format selection screen.

As described above, according to the present exemplary embodiment, when the user sets a file format, the CPU 211 determines whether transmission with the setting is possible. If, as a result of the determination, such transmission with the setting is possible, the CPU 211 receives the setting. If not, the CPU 211 performs control to reject the setting. Thereby, since the MFP 101 can be prevented from transmitting data in a page format that is not intended by the user, convenience for the user is further improved.

Next, a third exemplary embodiment of the present invention will be described. In the first exemplary embodiment, if the MFP 101 needs to establish a plurality of communication sessions, the MFP 101 transmits one page of image data while switching communication sessions. If the MFP 101 needs to establish a plurality of communication sessions, the MFP 101 performs communication control in which image data is sequentially transmitted to the destinations with which the MFP 101 has established a communication session. The third exemplary embodiment includes an operation in addition to those in the first exemplary embodiment. More specifically, if the MFP 101 needs to establish a plurality of communication sessions and if the user sets a multi-page format, the MFP 101 presents transmission methods to the user. Depending on the transmission method selected by the user, the MFP 101 switches communication control illustrated in steps S1004 to S1011 according to the first exemplary embodiment and communication control in which transmission is started after the image data of all the documents is temporarily stored in the memory. In the third exemplary embodiment, the same configurations as those in the first exemplary embodiment are denoted by the same reference numerals, and detailed description thereof will be omitted.

Figure 12A:
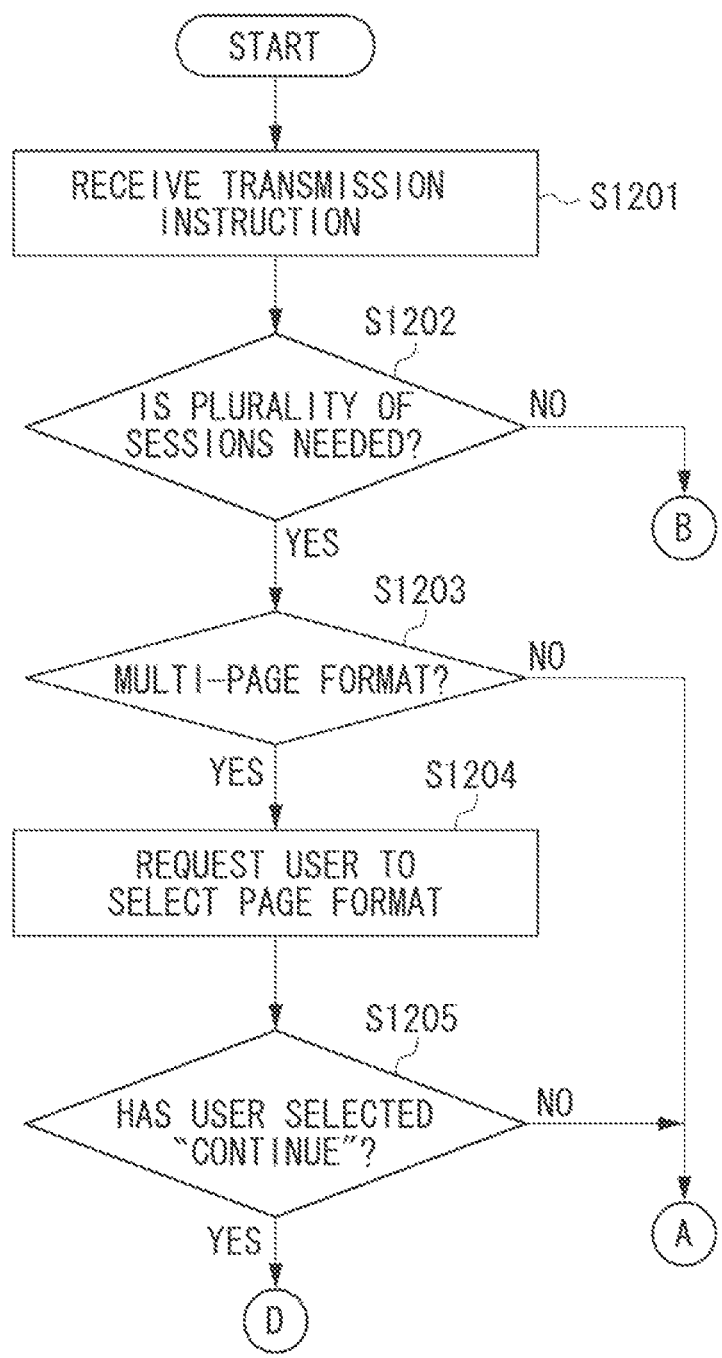
FIG. 12A is a flowchart illustrating a transmission operation of an MFP according to a third exemplary embodiment of the present invention.
Figure 12B:
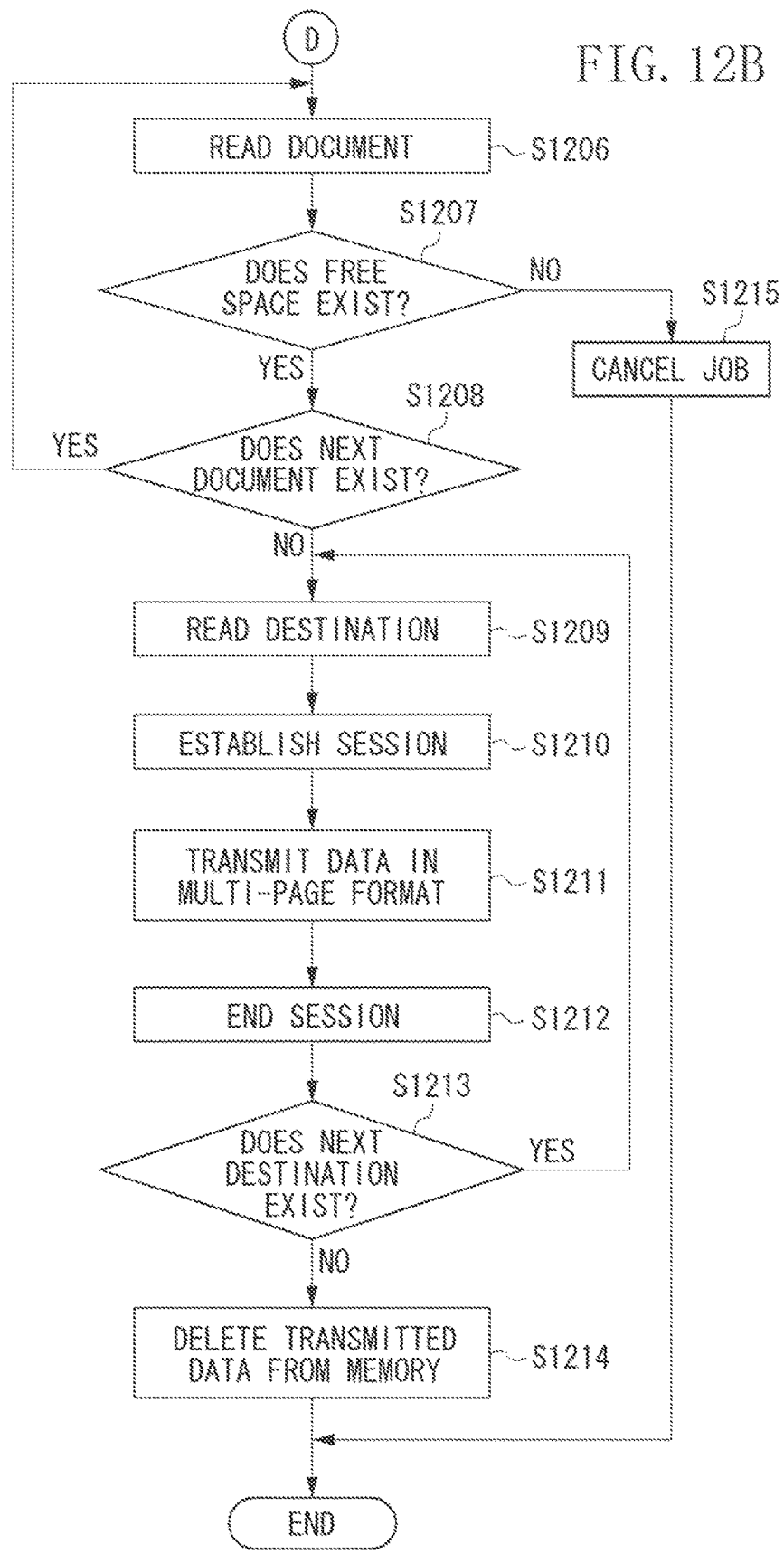
FIG. 12B is a flowchart illustrating a transmission operation of an MFP according to a third exemplary embodiment of the present invention.

FIG. 12 is a flowchart illustrating image data transmission control according to the third exemplary embodiment. Each operation (step) illustrated in the flowchart in FIG. 12 is realized by causing the CPU 211 in the MFP 101 to execute a control program stored in the ROM 212 or the RAM 213.

If the user presses the start key 506, the CPU 211 starts transmission processing. In step S1201, the CPU 211 receives a transmission instruction.

Next, in step S1202, the CPU 211 determines whether the MFP 101 needs to establish a plurality of communication sessions to transmit image data to the set destination(s). If a plurality of communication sessions is not needed (NO in step S1202), the processing proceeds to step S1012 (FIG. 10), and the MFP 101 performs the above transmission control in which image data is sequentially transmitted to the destination(s) with which a session has been established. If a plurality of communication sessions is needed (YES in step S1202), the processing proceeds to step S1203.

In step S1203, the CPU 211 determines whether the set page format is a multi-page format. If so (YES in step S1203), the processing proceeds to step S1204. If not (NO in step S1203), the processing proceeds to step S1004 and the CPU 211 performs transmission control for transmitting the single-page format file to the plurality of destinations.

Figure 13:
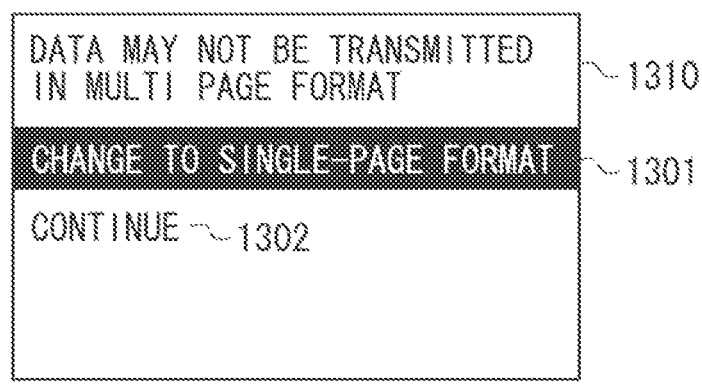
FIG. 13 illustrates an operation screen displayed by the MFP according to the third exemplary embodiment of the present invention.

In step S1204, the display unit 501 displays a screen for requesting the user to designate a transmission method. FIG. 13 illustrates a screen displayed to the user in step S1204. FIG. 13 illustrates "Change to single-page format" and "Continue" as functions 1301 and 1302, respectively. In addition, information 1310 is used for notifying the user that in a multi-page format all the data may not be transmitted because of an insufficient memory.

If the user designates the function 1301 or 1302, the processing proceeds to step S1205. In step S1205, the CPU 211 determines whether the user has designated the function 1301 or the function 1302. If the CPU 211 determines that the user has designated the function 1301 (NO in step S1205), the processing proceeds to step S1004, and the CPU 211 performs transmission control for transmitting the single-page format file to the plurality of destinations. If the CPU 211 determines that the user has designated the function 1302 (YES in step S1205), the CPU 211 maintains the multi-page format and the processing proceeds to step S1206.

These steps S1204 and S1205 may be performed before the CPU 211 receives the transmission instruction. For example, steps S1204 and S1205 may be performed at the time a destination is set via the function 604 or at the time a file format is set via the function 708.

If the CPU 211 receives a destination setting via the function 604, a plurality of communication sessions is needed, and the set page format is a multi-page format, the display unit 501 displays the screen for requesting the user to designate a transmission method (FIG. 13). In this case, if the user designates the function 1301, the CPU 211 changes the page format to a single-page format and receives the destination setting. If the user selects the function 1302, the CPU 211 ends the destination setting without changing the page format.

If setting of a file format is received via the function 708, this operation is similarly performed. If the page format that corresponds to the received file format is a multi-page format and a plurality of communication sessions is needed, the CPU 211 causes the display unit 501 to display the screen for requesting the user to select a communication method (FIG. 13) to prompt change of the page format.

In this case, the MFP 101 may be configured such that, if the CPU 211 determines that the page format is not a multi-page format in step S1203 (NO in step S1203), the processing proceeds to step S1004 and that, if the CPU 211 determines that the page format is a multi-page format in step S1203 (YES in step S1203), the processing proceeds to step S1206.

In this way, when the transmission setting is made, by querying the user whether to change the page in advance, the same processing as steps S1204 and S1205 can be performed.

Even when determining whether to change the page format to a single-page format is performed before a transmission instruction is received, the processing in accordance with steps S1204 and step S1205 may be performed again.

Steps S1206 to S1215 correspond to a flowchart illustrating image data transmission control performed at the time when the user designates the function 1302.

In step S1206, the CPU 211 causes the scanner 221 to read one page of the documents and stores the image data in the RAM 213, as in step S1004.

In step S1207, the CPU 211 determines whether a free space exists in the image data storage area. More specifically, the CPU 211 determines whether the image data storage area has a sufficient area for storing one page of image data.

If the CPU 211 determines that such a free space does not exist (NO in step S1207), the processing proceeds to step S1215 and the CPU 211 cancels the job. In step S1215, the CPU 211 cancels reading of the documents, deletes all the image data stored in the image data storage area (frees the memory area), and ends the transmission operation. If the CPU 211 determines that such a free space exists (YES in step S1207), the processing proceeds to step S1208. In step S1208, the CPU 211 determines whether the next document exists. If the next document exists (YES in step S1208), the processing returns to step S1206. Otherwise (NO in step S1208), the processing proceeds to step S1209. Since the area sufficient for storing one page of image data varies depending on various settings such as the document reading size, the color mode, and the reading resolution, this area is calculated on the basis of the reading settings.

In step S1209, the CPU 211 reads information about one of the set destinations. In step S1210, the CPU 211 establishes a communication session between the MFP 101 and the destination on the basis of the destination information read in step S1209. In step S1211, the MFP 101 transmits the image data of a plurality of documents stored in the RAM 213 to the set destination. In step S1212, the CPU 211 ends the communication session established between the MFP 101 and the destination. In step S1213, the CPU 211 determines whether there is another destination to which the image data needs to be transmitted. If such a destination exists (YES in step S1213), the processing returns to step S1209, and the CPU 211 reads information about this destination and performs the subsequent image data transmission control. In step S1213, if the CPU 211 determines that no destinations to which the image data needs to be transmitted exist (NO in step S1213), the CPU 211 determines that data transmission to all the destinations has been completed, and the processing proceeds to step S1214. In step S1214, the CPU 211 deletes the transmitted image data (frees the memory area) and ends the transmission operation.

As described above, according to the present exemplary embodiment, if the MFP 101 needs to establish a plurality of communication sessions and the user designates a multi-page format, the CPU 211 requests the user to select whether to change the page format. If the user designates "Change to single page," the CPU 211 establishes a communication session with a destination, transmits image data, and ends the communication session with the destination. The CPU 211 repeats this series of steps to transmit all the image data. If the user designates "Continue," the CPU 211 reads all the documents and then, transmits the image data. In this way, when an option set by the user is changed, the CPU 211 requests for a user instruction. Consequently, the possibility that data is transmitted in a file format that the user does not intend can be reduced.

With the configurations described in the first to third exemplary embodiments, even an image processing apparatus with scarce memory resources can provide a transmission function that is more convenient for the user, by performing transmission control based on a communication session.

According to the present invention, it is possible to transmit image data to a plurality of destinations with a simple operation while saving the memory usage.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-010701 filed Jan. 23, 2014, which is hereby incorporated by reference herein in its entirety.

What is claimed is:

1. An image processing apparatus comprising:
a setting unit configured to set a destination;
a scanning unit configured to scan at least a part of a plurality of documents and generate image data;
a transmission unit configured to transmit the image data;
a control unit configured to perform control such that, when a plurality of destinations that correspond to communication sessions different from each other is set by the setting unit,
starting a communication session that corresponds to one of the plurality of destinations,
transmitting the image data of the at least the part of the plurality of documents to the destination through the communication session, and
ending the communication session are repeated until transmission of the image data to all the plurality of destinations is completed, and then, in a case where another part of the plurality of documents exists, the scanning unit starts scanning another part of the plurality of documents;
a reception unit configured to receive a designation of a format of image data to be transmitted by the transmission unit; and
a determination unit configured to determine whether transmission of image data needs a plurality of communication sessions on the basis of the destination set by the setting unit,
wherein, in a case where the determination unit determines that a plurality of communication sessions is not needed, the control unit performs control such that image data is converted into a file on the basis of a format received by the reception unit and the file is transmitted and, in a case where the determination unit determines that a plurality of communication sessions is needed, even if the format received by the reception unit is a format that stores a plurality of pages of image data in a single file, the control unit performs control such that each page of image data is converted into a respective file of a plurality of files and the obtained files are transmitted, and
wherein a part of the control unit is implemented by a processor and a memory.

2. The image processing apparatus according to claim 1, wherein, in a case where a single destination is set by the setting unit, the control unit performs control such that image data of all documents is transmitted through a single communication session.

3. The image processing apparatus according to claim 1, wherein, even if a plurality of destinations is set by the setting unit, in a case where image data of all documents can be transmitted to the plurality of destinations through a single communication session, the control unit performs control such that the image data is transmitted through a single communication session.

4. The image processing apparatus according to claim 1, wherein image data can be transmitted to a plurality of destinations through a single communication session in a case where all the destinations correspond to e-mail.

5. The image processing apparatus according to claim 1, wherein, in a case where a plurality of destinations that correspond to communication sessions different from each other is set by the setting unit, the control unit performs control such that each page of image data is converted into a respective file of a plurality of files and the obtained files are transmitted.

6. The image processing apparatus according to claim 1, wherein, when the image data is transmitted to each of the plurality of destinations, in a case where a destination to which the image data cannot be transmitted exists, the control unit does not transmit the image data of another part to the destination to which the image data cannot be transmitted.

7. The image processing apparatus according to claim 1, wherein the reception unit can receive a designation of any one of file formats including at least Portable Document Format (PDF), Tagged Image File Format (TIFF), or Joint Photographic Experts Group (JPEG), and in a case where the designated file format stores a plurality of pages of image data in a single file, the reception unit receives an instruction about whether to process the image data as a single page such that each page of the image data is stored in a respective individual file or as multiple pages such that a plurality of pages of image data is stored in a single file.

8. The image processing apparatus according to claim 1, wherein a destination set by the setting unit corresponds to at least one of electronic mail (e-mail), Server Message Block (SMB), File Transfer Protocol (FTP), and Distributed Authoring and Versioning protocol for the WWW (WebDAV).

9. The image processing apparatus according to claim 1, wherein the image data of at least a part of a plurality of documents is one page of image data generated by causing the scanning unit to scan a single page of documents.

10. The image processing apparatus according to claim 1, further comprising
a restriction unit configured to restrict a designation of a format that stores a plurality of pages of image data in a single file in a case where the determination unit determines that a plurality of communication sessions is needed.

11. The image processing apparatus according to claim 10, wherein, in a case where the reception unit receives a designation of a format that stores a plurality of pages of image data in a single file after a plurality of destinations that correspond to communication sessions different from each other is set by the setting unit, the restriction unit rejects the designation of the format.

12. The image processing apparatus according to claim 10, wherein the restriction unit performs control such that when the reception unit receives a designation of a format in a case where a plurality of communication sessions is not needed, all file formats are displayed as selectable formats, and in a case where a plurality of communication sessions is needed, a format that stores a plurality of pages of image data in a single file is grayed out and a format that stores one page of image data in a single file is displayed as a selectable format.

13. The image processing apparatus according to claim 1, further comprising
a selection unit configured to receive, in a case where the determination unit determines that a plurality of communication sessions is needed and in a case where the format received by the reception unit is not a format for storing one page of image data in a single file, a selection of processing from a user.

14. The image processing apparatus according to claim 13, wherein, in a case where changing the format received by the reception unit to a format that stores one page of image data in a single file is selected, a plurality of files each storing a corresponding page of image data is transmitted.

15. The image processing apparatus according to claim 13, wherein, in a case where maintaining the format received by the reception unit is selected, after the scanning unit scans all documents that need to be scanned, transmission of the image data is started.

16. The image processing apparatus according to claim 1, wherein when the scanning unit starts scanning the another part of the plurality of documents, the scanning unit generates another image data, and
wherein in the case where the another part of the plurality of documents exists, the control unit is further configured to perform control such that, when the plurality of destinations that correspond to communication sessions different from each other is set by the setting unit,
starting a communication session that corresponds to one of the plurality of destinations,
transmitting the another image data of the another part of the plurality of documents to the destination through the communication session, and
ending the communication session are repeated until transmission of the another image data to all the plurality of destinations is completed.

17. A control method for an image processing apparatus including a scanning unit configured to scan a document and generate image data, the control method comprising:
requesting a user to set a destination;
receiving a designated format for image data to be transmitted;
determining whether transmitting image data of at least a part of a plurality of documents needs a plurality of communication sessions based on the designated format;
in accordance with determining that transmitting the image data of the at least the part of the plurality of documents does not need a plurality of communication sessions, converting the image data of the at least the part of the plurality of documents into a file on the basis of the designated format;
in accordance with determining that transmitting the image data of the at least the part of the plurality of documents does need a plurality of communication sessions, even if the designated format is a format that stores a plurality of pages of image data in a single file, converting each page of the image data of the at least the part of the plurality of documents into a respective file of a plurality of files;
repeating, when the user sets a plurality of destinations that correspond to communication sessions different from each other, a process of
starting a communication session that corresponds to one of the plurality of destinations,
in accordance with determining that transmitting the image data of the at least the part of the plurality of documents does not need a plurality of communication sessions, transmitting the file to the destination through the communication session,
in accordance with determining that transmitting the image data of the at least the part of the plurality of documents does need a plurality of communication sessions, transmitting a file of the plurality of files to the destination through the communication session, and ending the communication session until transmission to all the plurality of destinations is completed; and after completion of the repeating, starting, in a case where another part of the plurality of documents exists, a process of scanning another part of the plurality of documents.

18. A non-transitory storage medium which stores a computer-readable program for performing a control method for an image processing apparatus including a scanning unit configured to scan a document and generate image data, the program comprising:

requesting a user to set a destination;

receiving a designated format for image data to be transmitted;

determining whether transmitting image data of at least a part of a plurality of documents needs a plurality of communication sessions based on the designated format;

in accordance with determining that transmitting the image data of the at least the part of the plurality of documents does not need a plurality of communication sessions, converting the image data of the at least the part of the plurality of documents into a file on the basis of the designated format;

in accordance with determining that transmitting the image data of the at least the part of the plurality of documents does need a plurality of communication sessions, even if the designated format is a format that stores a plurality of pages of image data in a single file, converting each page of the image data of the at least the part of the plurality of documents into a respective file of a plurality of files;

repeating, when the user sets a plurality of destinations that correspond to communication sessions different from each other, a process of starting a communication session that corresponds to one of the plurality of destinations, in accordance with determining that transmitting the image data of the at least the part of the plurality of documents does not need a plurality of communication sessions, transmitting the file to the destination through the communication session, in accordance with determining that transmitting the image data of the at least the part of the plurality of documents does need a plurality of communication sessions, transmitting a file of the plurality of files to the destination through the communication session, and ending the communication session until transmission to all the plurality of destinations is completed; and starting, in a case where another part of the plurality of documents exists, a process of scanning another part of the plurality of documents.

19. An image processing apparatus comprising:
a setting unit configured to set a destination;
a scanning unit configured to scan at least a part of a plurality of documents and generate image data;
a storage unit configured to store image data generated by the scanning unit;
a transmission unit configured to transmit image data stored in the storage unit;
a control unit configured to
cause, when a plurality of destinations that correspond to communication sessions different from each other is set by the setting unit, the storage unit to store the image data obtained by scanning the at least the part of the plurality of documents,
cause the transmission unit to transmit the image data of the at least the part of the plurality of documents stored in the storage unit to each of the plurality of destinations through a communication session per destination,
cause the storage unit to free a storage area that corresponds to the image data of the at least the part of the plurality of documents, and
cause, in a case where another part of the plurality of documents exists, the scanning unit to start scanning the another part of the plurality of documents;
a reception unit configured to receive a designation of a format of image data to be transmitted by the transmission unit; and
a determination unit configured to determine whether transmission of image data needs a plurality of communication sessions on the basis of a destination set by the setting unit,
wherein, in a case where the determination unit determines that a plurality of communication sessions is not needed, the control unit performs control such that image data is converted into a file on the basis of a format received by the reception unit and the file is transmitted and, in a case where the determination unit determines that a plurality of communication sessions is needed, even if the format received by the reception unit is a format that stores a plurality of pages of image data in a single file, the control unit performs control such that each page of image data is converted into a respective file of a plurality of individual files and the obtained files are transmitted, and
wherein a part of the control unit is implemented by a processor and a memory.

20. The image processing apparatus according to claim 19,
wherein, even if a plurality of destinations is set by the setting unit, in a case where image data can be transmitted to the plurality of destinations through a single communication session, the control unit performs control such that image data of all documents is transmitted through a single communication session.

* * * * *